United States Patent [19]
Ono et al.

[11] Patent Number: 5,104,573
[45] Date of Patent: Apr. 14, 1992

[54] GREEN LIGHT EMITTING PHOSPHOR

[75] Inventors: Katsutoshi Ono, Tokyo; Tomohiko Abe, Kanagawa; Tsuneo Kusunoki, Kanagawa; Yuichi Kimizuka, Kanagawa, all of Japan

[73] Assignee: Sony Corporation, Tokyo, Japan

[21] Appl. No.: 422,103

[22] Filed: Oct. 16, 1989

[30] Foreign Application Priority Data

Oct. 17, 1988 [JP] Japan ................................ 63-261133

[51] Int. Cl.$^5$ .............................................. C09K 11/80
[52] U.S. Cl. ........................ 252/301.4 F; 252/301.4 R
[58] Field of Search ................... 252/301.4 F, 301.4 R

[56] References Cited

U.S. PATENT DOCUMENTS

| | | | |
|---|---|---|---|
| 3,887,753 | 6/1975 | Ninagawa et al. | 252/301.4 F |
| 4,093,890 | 6/1978 | Verriet et al. | 252/301.4 F |
| 4,707,635 | 11/1987 | Tateyama et al. | 252/301.4 F |
| 4,924,139 | 5/1990 | Morita et al. | 252/301.4 R |

FOREIGN PATENT DOCUMENTS 56-18677 2/1981 Japan ............................ 252/301.4 F
2149416 6/1985 United Kingdom.

OTHER PUBLICATIONS

Patent Abstracts of Japan, vol. 11, No. 361 (C-459) [2808], Nov. 25th 1987; of JP-A- 62 131 085 (Hitachi 13/06/1987).

*Primary Examiner*—Jack Cooper
*Attorney, Agent, or Firm*—Hill, Van Santen, Steadman & Simpson

[57] ABSTRACT

A green light emitting phosphor comprising tetravalent elements added to a green light emitting phosphor, $Y_3(Al,Ga)_5O_{12}$:Tb, wherein the green light emitting phosphor can prevent a so-called electron beam burning even when excited by electron beams of high energy. The green light emitting phosphor is, particularly suitable to be applied to a projector tube or a high-brightness phosphor display tube.

5 Claims, 2 Drawing Sheets

GREEN LIGHT EMITTING PHOSPHOR

BACKGROUND OF THE INVENTION

The present invention relates to a green light emitting phosphor, particularly a green light emitting phosphor of high excitation, which can be applied to, for example, a projector tube or a high-brightness phosphor display tube.

Among the known Tb (terbium) activated green light emitting phosphors, the phosphor $Y_3(Al, Ga)_5 O_{12}$:Tb provides excellent brightness and saturation characteristic through the addition of Ga (gallium) as a green light emitting phosphor which is excited by electron beams of high energy. This is disclosed, for example, in Japanese Laid-Open Patent Gazette No. 60-101175.

A disadvantage of this known green light emitting phosphor is that it will deteriorate through the irradiation of electron beams. In other words, the body color of the green light emitting phosphor is changed by a so-called "burning". The burning occurs when the green light emitting phosphor is heated by the irradiation of electron beams. For example, when a phosphor screen of a projector tube or of a high-brightness phosphor display tube is formed using this type of known phosphor, and electron beams continuously impinge on the phosphor screen, in order to display a still image or a still picture portion of an image, the "electron beam burning" occurs locally, and deteriorates the image quality.

FIG. 1 shows the measured results of relative brightness versus aging time of phosphor screens. In the example used with this figure, the phosphor screens for an 8-inch projector tube were formed of green light emitting phosphors, $Y_3Al_xGa_{5-x}O_{12}$:Tb of 7 mol percent, and the amount of Ga was changed, respectively. These phosphors were continuously irradiated with electron beams under conditions where the phosphor screen voltage (anode voltage, i.e. excitation voltage) was 32 kV and the anode current was 5 μA/Cm². An initial brightness was taken as a reference (100%).

In FIG. 1, an open square, an open circle, and an open triangle chart the measured results of the relative brightness of the green light emitting phosphors where x=0, 3, and 5 in $Y_3Al_xGa_{5-x}O_{12}$:Tb, respectively. When comparing curves 1, 2, and 3, which follow from the measured results, it is shown that as the amount of Ga increases, the amount of electron beam burning, i.e. the amount of deterioration of brightness of the green light emitting phosphor by the irradiation of electron beams, is increased. Although the brightness and saturation characteristics of the green light emitting phosphor are improved by the substitution of Ga, it is unavoidable that the irradiation of electron beams will cause the brightness of the green light emitting phosphor to deteriorate.

One of the reasons for the deterioration of the brightness of the green light emitting phosphor is the valence state of Tb. Tb enters this type of phosphor at a so-called Y site, in the form of a trivalent. Unfortunately, Tb is in a stable condition when it is in the form of a tetravalent. If the phosphor is irradiated by electron beams, Tb's valence state can easily shift to that of a tetravelent element which causes the body color of the green light emitting phosphor to become brownish. In addition, Tb enters the Y site in an unstable state which causes a deterioration of the brightness characteristic of the green light emitting phosphor.

SUMMARY OF THE INVENTION

It is an object of the present invention to provide an improved green light emitting phosphor which can eliminate the defects encountered with known green light emitting phosphors. A further object is to provide a green light emitting phosphor which can resolve the problem of electron beam burning in the known $Y_3$ (Al, Ga)$_5$ O$_{12}$:Tb green light emitting phosphor. Another object of the present invention is to provide a green light emitting phosphor which improves on preventing the lowering of the brightness of the phosphor by the excitation of high energy. Another object is to provide a green light emitting phosphor which is suitable for being applied to a projector tube, a phosphor display tube of high brightness or the like.

To this end, the present invention provides a green light emitting phosphor consisting of a green light emitting phosphor having a formula $Y_3(Al,Ga)_5O_{12}$:Tb and means to reduce electron-burning of said phosphor, said means consisting of a tetravalent element by a molar ratio relative to a sum of Y and Tb ranging from $1 \times 10^{-5}$ to $5 \times 10^{-1}$.

In an embodiment, the molar ratio ranges from approximately $1 \times 10^{-5}$ to $1 \times 10^{-3}$.

In an embodiment, the tetravalent element is chosen from the group consisting of $Si^{4+}$, $Ge^{4+}$, $Ti^{4+}$, $Zr^{4+}$, $Hf^{4+}$, and $Sn^{4+}$.

In an embodiment, the phosphor is particularly suitable for being applied to a projector tube or a high-brightness phosphor display tube.

In an embodiment, the method for producing the phosphor includes adding a green light emitting phosphor $Y_3(Al,Ga)_5O_{12}$:Tb to a tetravalent element by a molar ratio relative to the sum of Y and Tb ranging from $1 \times 10^{-5}$ to $5 \times 10^{-1}$.

DETAILED DESCRIPTION OF THE PRESENTLY PREFERRED EMBODIMENTS

The present invention relates to a green light emitting phosphor and, particularly, a green light emitting phosphor of high excitation which is suitable for being applied, for example, to a projector tube, a high-brightness phosphor display tube or the like.

EXAMPLES

By way of example, and not limitation, examples of the present invention will now be given.

EXAMPLE 1

A green light emitting phosphor of high excitation type, $Y_3Al_3Ga_2O_{12}$:Tb phosphor was made. The molar ratio of Al/Ga was 1.5. The ratio of Tb/(Y+Tb) was 0.07, and the Si/(Y+Tb) ratio was $2.8 \times 10^{-3}$. As raw materials, the following powders were prepared:

| | |
|---|---|
| $Y_2O_3$ | 31.05 g |
| $Al_2O_3$ | 15.29 g |
| $Ga_2O_3$ | 18.74 g |
| $Tb_4O_7$ | 3.93 g |
| $SiO_2$ | 0.05 g |

(purity of each of these powders is a so-called four nine, i.e. 99.99%). These powders were added together, along with the highest class reagent, $BaF_2$ which forms residual flux. The materials were then mixed with a solvent of 120 cc of ethanol with a ball mill. According to this ball mixing-process, an alumina ball, which was 5 mm in diameter and had a purity of more than 99.8%, was prepared. The raw materials in the alumina balls, whose amount was about 2 to 3 times that of the raw materials, for example 150 g in weight, were then put into a 0.5 liter receptacle which was made of a polyethylene-system material. The raw materials and alumina balls were mixed for five hours. The receptacle was rotated at a rotation rate of 60 rpm.

The alumina balls and the mixed raw materials were then separated by a filtering-process or the like. The ethanol was removed from the product by a drying-process. The dried raw material was then put into a crucible, which had a lid of alumina of a high purity (higher than 99.8%). The lid and the crucible body were shielded by a heat-resistant bonding agent, for example, Aron Ceramic D (trade name, manufactured by Toagosei Chemical Industry Co., Ltd.). The crucible was placed in a furnace and heated up to 1500° C. by raising the temperature by 200° C. per hour. The crucible was kept at that temperature, i.e. 1500° C., for two hours, and then cooled in the furnace. The burned phosphor was rinsed with 10 cc of nitric acid with the normal 1.5 per 1 g of burned phosphor for 60 minutes in order to remove residual flux ($BaF_2$) the burned phosphor. The phosphor was then rinsed with water to provide a pH of 7. Finally, it was filtered and dried. Thus, the green light emitting phosphor $Y_3Al_3Ga_2O_{12}$:Tb, with 7 mol percent of Tb, was produced.

Figure 1:
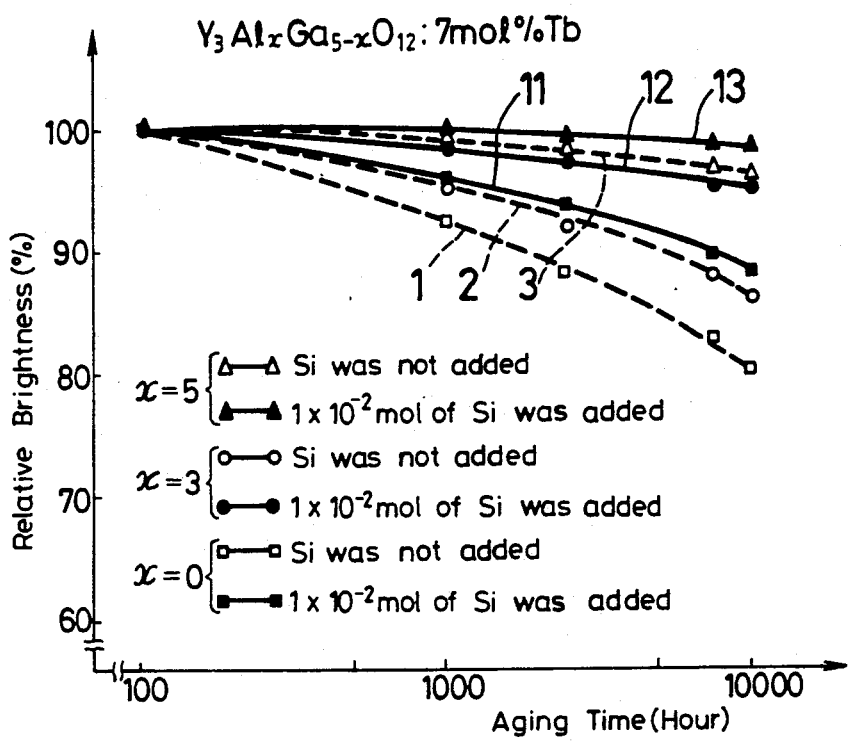
FIG. 1 is a graph showing the measured results of aging time versus relative brightness of the phosphor screen when the electron beam impinges on the phosphor screen.

The phosphor was then used in the manufacture of a phosphor screen of an 8-inch projector tube. The screen was manufactured by a printing-process. This phosphor screen was then aged under conditions where the anode voltage was 32 kV and the anode current was 5 $\mu A/cm^2$. FIG. 1 shows the measured results of the aging time versus the relative brightness of the phosphor screen. In the figure, a solid square, a solid circle, and a solid triangle, respectively, plot respective brightness of the phosphors in which x was selected to be 0, 3, and 5, in the phosphor composition, $Y_3Al_xGa_{1-x}O_{12}$:Tb of 7 mol percent of Tb, respectively. Comparing characteristic curves 11, 12, and 13 with the prior art curves 1, 2, and 3, the graph illustrates that when Si was added to the phosphor in Example 1, the deterioration of brightness, i.e. electron beam burning, could be considerably reduced.

EXAMPLE 2

Figure 2:
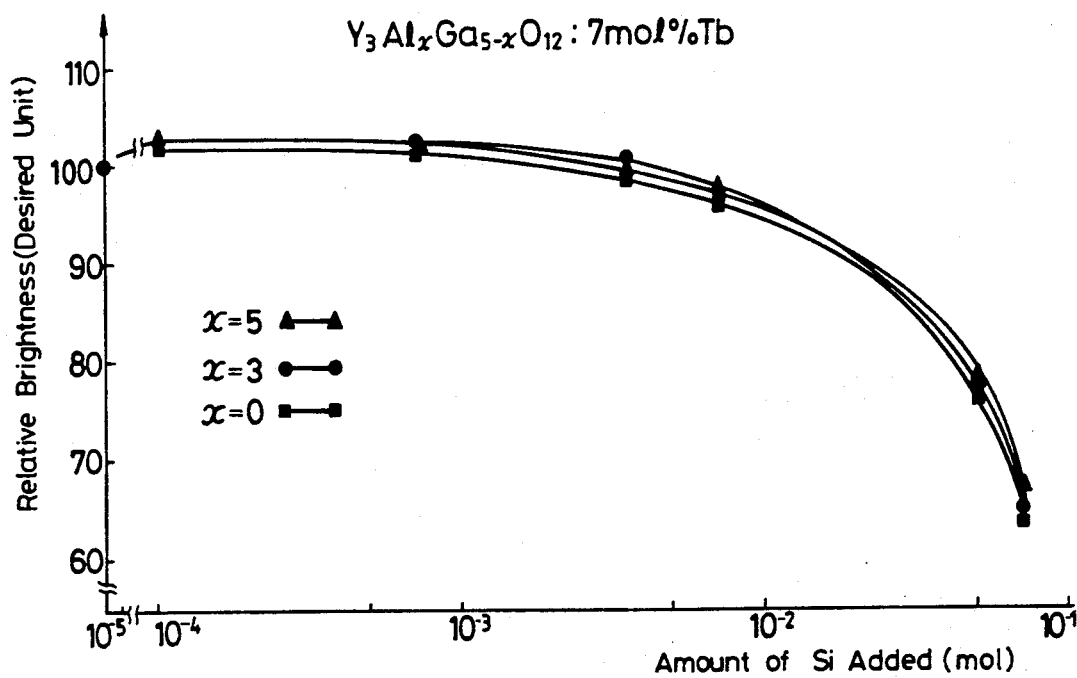
FIG. 2 is a graph displaying a relationship between the amount of Si added to a phosphor and the relative brightness of the phosphor.

A green light emitting phosphor was made similar to the phosphor of Example 1. The phosphor without Si was used as the basis for this example. The phosphor's initial relative brightness was then measured while the amount of Si added was changed. The measured results are represented in FIG. 2. In FIG. 2, a solid square, a solid circle, and a solid triangle, respectively, represent relative brightness of the green light emitting phosphors in which x was selected to be 0, 3, and 5 in composition, $Y_3Al_xGa_{5-x}O_{12}$:7 and 1% Tb, respectively. FIG. 2 reveals that the addition of Si can prevent the initial brightness of the green light emitting phosphors from being lowered.

EXAMPLE 3

Figure 3:
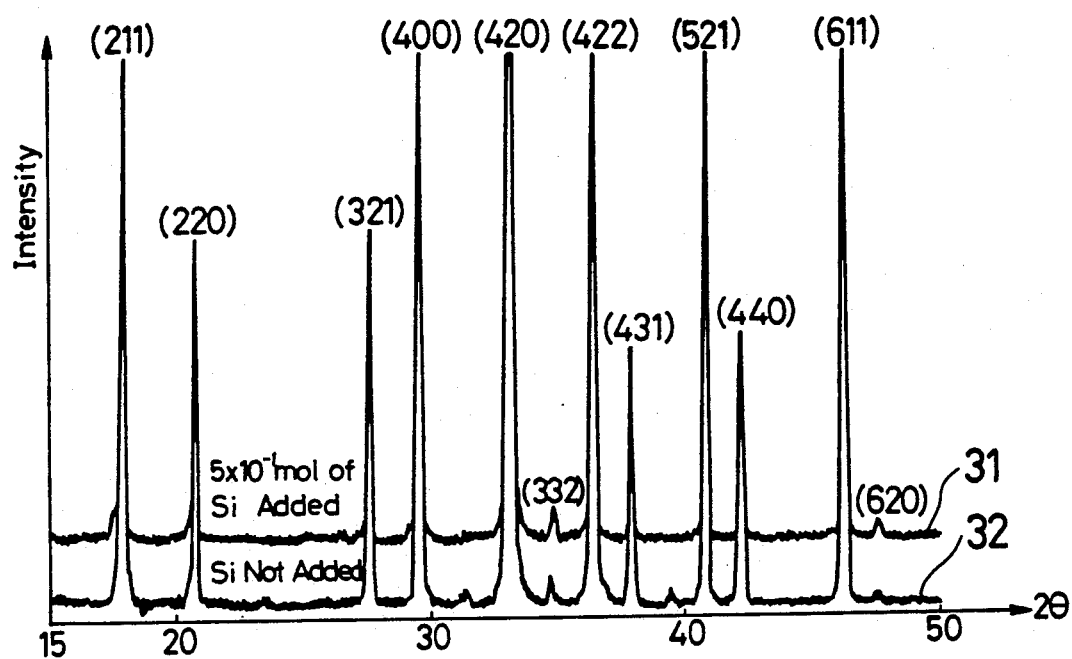
FIG. 3 is a spectrum diagram of a small angle x-ray diffraction analysis.

A $Y_3Al_2Ga_3O_{12}$:Tb of 7 mol percent was produced according to the method of Example 1 where $5 \times 10^{-1}$ mol of Si was added. FIG. 3 is a spectrum diagram of a small x-ray diffraction of the phosphor of this example and a phosphor without Si. Characteristic curve 31 represents the phosphor of Example 3, and curve 32 represents the phosphor without Si. Comparing curves 31 and 32, the diagram illustrates that the change of spectrum is not observed and also, that Si is absorbed into the phosphor. Therefore, when Si is added thereto, Si is not deposited as $SiO_2$, and the generation of single-phase YAG is not affected.

Figure 4:
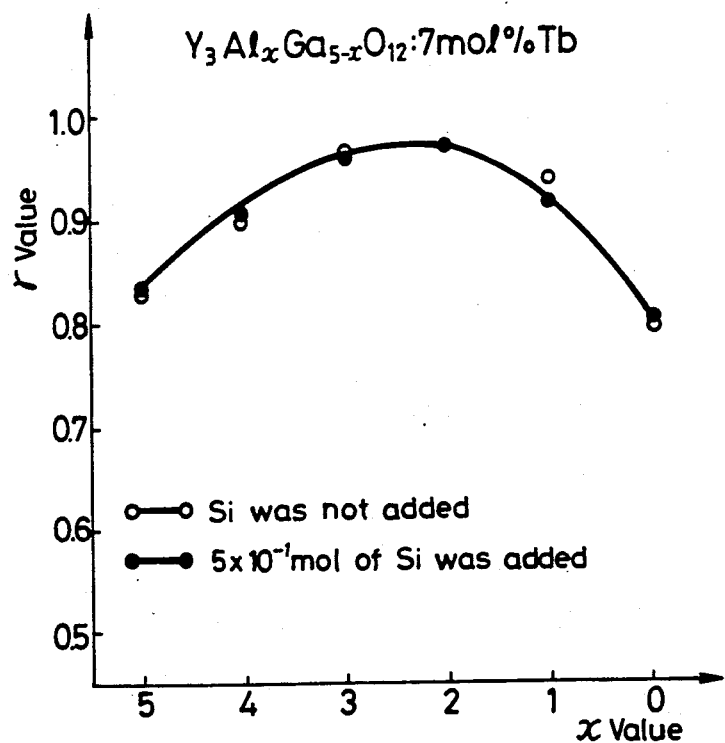
FIG. 4 is a graph showing measured results of the inclination of a current versus brightness curve.

More specifically, FIG. 4 shows the measured results of the inclination of a current versus brightness curve, i.e. the relationship between a so-called gamma ($\gamma$) value and the added amount of Ga. In FIG. 4, a solid circle represents the measured results of gamma values in which Si of $5 \times 10^{-1}$ mol was added. An open circle represents the measured results of gamma values in which Si was not added to the phosphor. The graph in FIG. 4, shows that the current brightness saturation characteristic does not change substantially, regardless of the addition of Si.

While $Si^{4+}$ is added to $Y_3Al_xGa_{5-x}O_{12}$:Tb in the above examples, other tetravalent elements, $Ge^{4+}$, $Ti^{4+}$, $Zr^{4+}$, $Hf^{4+}$ and $Sn^{4+}$ and $Sn^{4+}$ can be added to the phosphor and achieve similar results as when $Si^{4+}$ was added. Table 1 shows the observed results of electron beam burning when certain amounts of the above tetravalent elements were added to $Y_3Al_xGa_{5-x}O_{12}$:Tb. A so-called demountable apparatus, in which a phosphor screen panel of a cathode ray tube can be demounted, was employed in this experiment. Electron beams were impinged on the phosphor screen panel for 60 minutes under the excitation conditions of an anode voltage of 16 kV and an anode current of 100 $\mu A/cm^2$. The decrease of brightness, i.e. electron beam was measured in the table. In the table, an open circle represents a phosphor where the decrease in brightness is less than 10% of the initial brightness of the phosphor before it was irradiated with electron beams. An open triangle represents a phosphor where the decrease in brightness is 10 to 20% of the initial brightness of the phosphor before it was irradiated with electron beams. A cross mark represents a phosphor where the decrease in brightness is more than 20% of the initial brightness of the phosphor before it was irradiated with electron beams.

TABLE 1

| Elements to be added | Adding amount (molar ratio) | Electron beam "burning" |
|---|---|---|
| None | | X |
| $Si^{4+}$ | $1 \times 10^{-6}$ | Δ |
| | $1 \times 10^{-5}$ | ○ |
| | $1 \times 10^{-3}$ | ○ |
| | $5 \times 10^{-1}$ | ○ |
| | 1.0 | Δ |
| $Ge^{4+}$ | $1 \times 10^{-6}$ | Δ |
| | $1 \times 10^{-5}$ | ○ |

TABLE 1-continued

| Elements to be added | Adding amount (molar ratio) | Electron beam "burning" |
|---|---|---|
| | $1 \times 10^{-3}$ | O |
| | $5 \times 10^{-1}$ | O |
| | 1.0 | X |
| $Ti^{4+}$ | $1 \times 10^{-6}$ | Δ |
| | $1 \times 10^{-5}$ | O |
| | $1 \times 10^{-3}$ | O |
| | $5 \times 10^{-1}$ | O |
| | 1.0 | X |
| $Zr^{4+}$ | $1 \times 10^{-6}$ | X |
| | $1 \times 10^{-5}$ | O |
| | $1 \times 10^{-3}$ | O |
| | $5 \times 10^{-1}$ | O |
| | 1.0 | X |
| $Hf^{4+}$ | $1 \times 10^{-6}$ | X |
| | $1 \times 10^{-5}$ | O |
| | $1 \times 10^{-3}$ | O |
| | $5 \times 10^{-1}$ | O |
| | 1.0 | X |
| $Sn^{4+}$ | $1 \times 10^{-6}$ | Δ |
| | $1 \times 10^{-5}$ | O |
| | $1 \times 10^{-3}$ | O |
| | $5 \times 10^{-1}$ | O |
| | 1.0 | Δ |

From the results in Table 1, it is shown that when a tetravalent element is added to $Y_3Al_xGa_{5-x}O_{12}$:Tb in a molar ratio of the sum of Y and Tb ranging from $1 \times 10^{-5}$ to $5 \times 10^{-1}$, the electron beam burning can be effectively improved.

Therefore, since the electron beam burning can be effectively improved, the green light emitting phosphor of the present invention can be suitably used for various kinds of display tubes and image reproducing apparatus of the electron beam excitation type. According to the present invention, when the phosphor screen of the projector tube or the phosphor display tube of high brightness is formed of the green light emitting phosphor of the present invention, the image quality can be prevented from deteriorating. This is so even if a still picture is displayed on the phosphor screen or the phosphor screen is continuously impinged with electron beams in order to display a still portion of an image, or the phosphor screen is driven for a long period of time. Furthermore, the green light emitting phosphor of the present invention makes it possible to display a high-definition image which is very beneficial in practice.

It should be understood that various changes and modifications to the presently preferred embodiments described herein will be apparent to those skilled in the art. Such changes and modifications can be made without departing from the spirit and scope of the present invention an without diminishing its attendant advantages. It is therefore intended that such changes and modifications be covered by the appended claims.

We claim as our invention:

1. A green light emitting phosphor of the formula $Y_3(Al,Ga)_5O_{12}$:Tb, and a tetravalent element incorporated therein during its preparation selected from the group consisting of $Ti^{4+}$, $Hf^{4+}$, and $Sn^{4+}$, said tetravalent element being present in an amount so that the molar ratio of the tetravalent element to the sum of the Tb and Y is in a range of approximately $1 \times 10^{-5}$ to about $5 \times 10^{-1}$, said amount being sufficient to reduce electron-burning of the phosphor when it is irradiated with an electron beam.

2. A green light emitting phosphor according to claim 1, wherein the molar ratio is in a range of from approximately $1 \times 10^{-5}$ to about $1 \times 10^{-3}$.

3. A green light emitting phosphor according to claim 1, wherein the tetravalent element is $Ti^{4+}$.

4. A green light emitting phosphor according to claim 1, wherein the tetravalent element is $Hf^{4+}$.

5. A green light emitting phosphor according to claim 1, wherein the tetravalent element is $Sn^{4+}$.

* * * * *